Dec. 29, 1931.   E. W. STACEY   1,838,792
ART OF MANUFACTURING RUBBER GOODS
Filed May 14, 1927   2 Sheets-Sheet 1

INVENTOR
Ernest W. Stacey
By his Attorney
Nelson W. Howard

Dec. 29, 1931. E. W. STACEY 1,838,792
ART OF MANUFACTURING RUBBER GOODS
Filed May 14, 1927 2 Sheets-Sheet 2
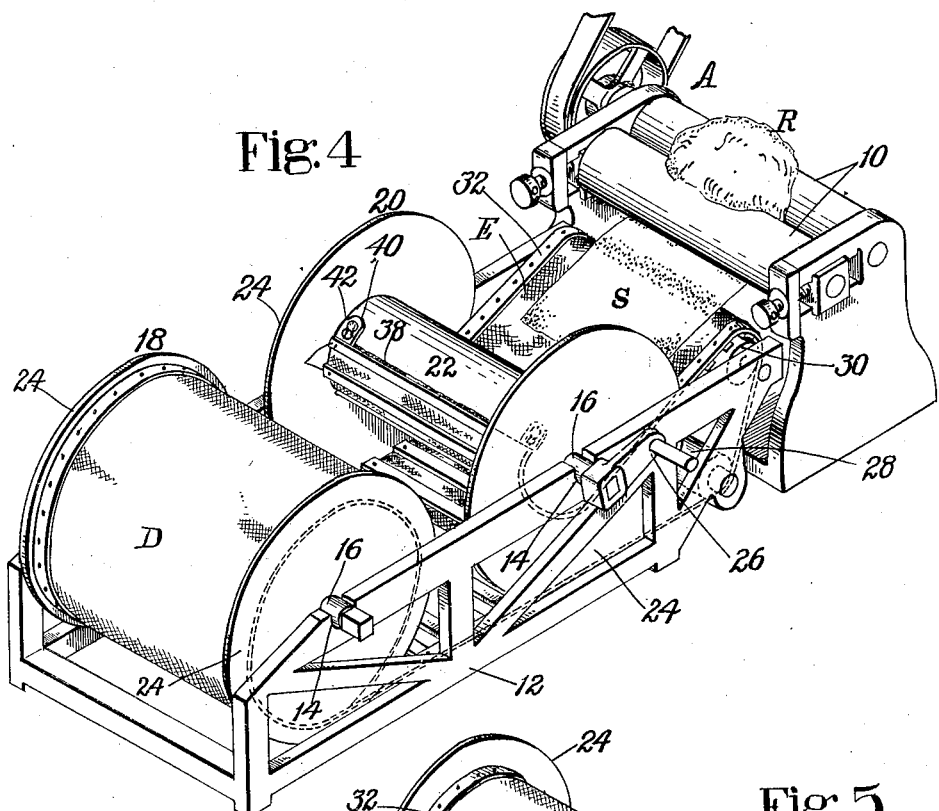
INVENTOR
Ernest W. Stacey
By his Attorney
Nelson W. Howard Patented Dec. 29, 1931

1,838,792

UNITED STATES PATENT OFFICE

ERNEST W. STACEY, OF BEVERLY, MASSACHUSETTS, ASSIGNOR TO UNITED SHOE MACHINERY CORPORATION, OF PATERSON, NEW JERSEY, A CORPORATION OF NEW JERSEY

ART OF MANUFACTURING RUBBER GOODS

Application filed May 14, 1927. Serial No. 191,459.

My invention relates to the manufacture of such rubber goods as shoes, and is particularly concerned with the production of sheet-rubber, its formation into a package from which it is to be used for parts of footwear, and its delivery for such utilization.

Considering, for example, the cutting out of uppers for rubber shoes, a common practice has been to receive sheet-rubber emerging from calendar-rolls in long strips upon trays having dimensions somewhat greater than those of the strips, and piling these trays with their contents upon one another until a number have accumulated. A pile of the filled trays is then transferred to a cutting position, where the sheets are taken one by one from the trays, placed upon large tables, and the uppers cut out under the guidance of designs embossed upon the stock by the calendar-rolls or with the aid of patterns. The considerable space required for filling, transferring, storing and emptying these trays and the labor necessary to care for them and for the stock which they hold will be obvious. When cut, a substantial waste occurs, because the ends of the relatively short sheets divide the embossed designs on the areas from which the pieces are to be taken. Objects of my invention are to substantially reduce both the area in which such operations take place and the handling of the stock and its separating devices, and to economize in the amount of stock required.

A feature of the invention whereby the above objects are attained consists of a method of operating upon rubber, in which a web of sheet-rubber stock is formed from a mass of rubber and in this condition before it has become deformed is laid upon and coiled with a separator, while maintaining between the convolutions of the separator a space greater than the thickness of the interposed stock. Said stock is thus so disposed that it is protected from adhesion and mutilation of the embossing as perfectly as though it were in trays, yet the package-coil is of relatively small dimensions. It may be assembled by depositing the stock upon the separator as it is formed, the two being coiled by a force applied to the separator to advance this at a rate leaving the stock free from tension. Moreover, it may be delivered or utilized by a reverse step, the package-coil being unwound under the influence of the separator, and the stock being simultaneously delivered for the cutting or other operation. Consequently, the only direct handling of the material with its separator is during the transfer between forming and utilizing positions, there being nothing of the nature of plural trays to be successively disposed of. Since the length of the web of stock is many times that of the sheets usually operated upon, the loss through divided end-areas is much reduced.

As another feature of this invention, I provide novel means for performing the previously indicated method. With an apparatus for forming rubber, such as calender-rolls, there is associated a reel arranged to supply the separator for the formed rubber, and a receiving reel to which the separator from the supply-reel, together with the rubber, is delivered. Means for rotating the receiving reel is provided, and thereby the separator and rubber are coiled together into the desired package. This package may furnish the supply-reel for the section of the apparatus in which the sheet-rubber is utilized. Here there is a receiving reel, to which the separator from the supply-reel is connected, and means arranged to rotate this receiving reel to coil the separator thereon and advance the rubber from the supply-reel across a cutting table, or other support on which operations are performed upon it. Preferably, this receiving reel is driven from power mechanism, which is controlled by the operator at the cutting table in accordance with his needs.

In the accompanying drawings,

Fig. 4 is a perspective view of an apparatus by which the package-assembling steps of my method may be performed; and Fig. 5 is a similar view of the stock-utilizing portion of the apparatus.

Figure 3:
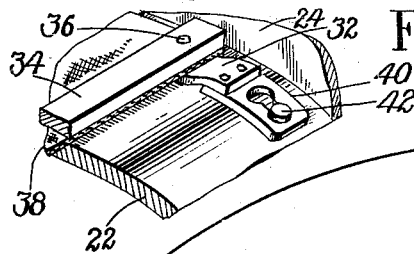
Fig. 3 shows in perspective the securing device for the separator.

Referring to Fig. 4, there appears at A a calender having rotatable rolls 10, 10, by which a mass of rubber or rubber-like material, indicated at R, is flattened into a sheet S of stock of uniform thickness. By maintaining a constant supply of rubber at the top of the calender-rolls, the sheet S may be caused to take the form of a continuous web of any desired length. At the side of the calender from which the stock emerges is shown a frame 12 provided with pairs of opposite depressions or bearings 14, 14, in which may be mounted spindles 16 of a supply-reel 18 and a receiving reel 20. These reels are preferably identical in character, in fact being used alternately for supplying a web-like separating device D for the sheet-rubber and for receiving said device and the rubber, they having the usual cylindrical core 22 and opposite heads 24, 24. Power may be applied to rotate the receiving reel, and thus wind the separator and rubber-stock upon it, by a crank 26 applied to the squared end of its spindle 16. The separator is guided from the supply-reel below the receiving reel and in proximity to the bite of the calender-rolls by a lower roll 28 and an upper roll 30.

Figure 1:
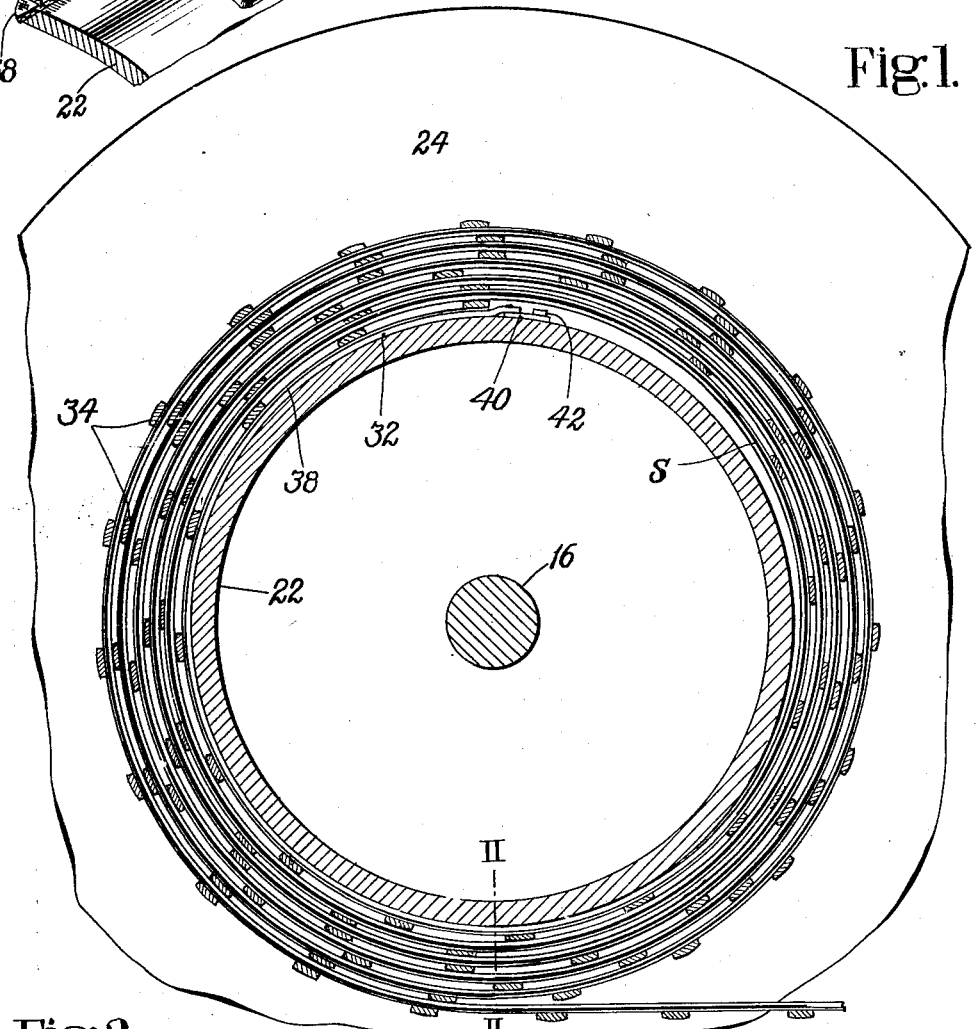
Fig. 1 illustrates in transverse section a form of the package produced by the method of this invention.
Figure 2:
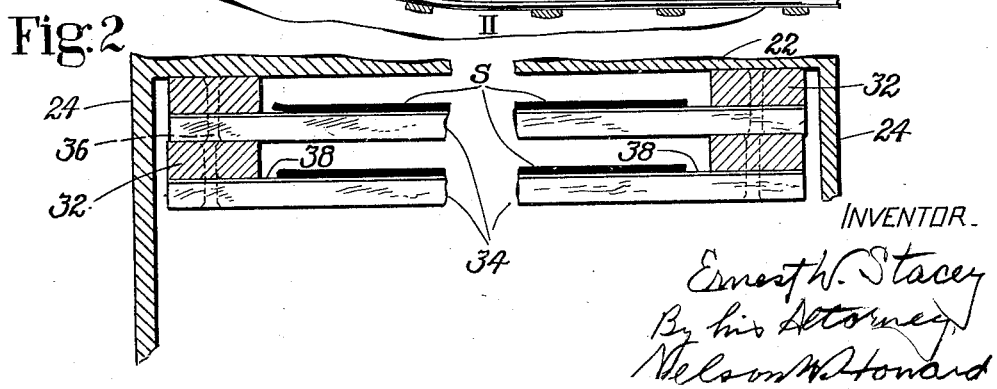
Fig. 2 is a section on the line II—II of Fig. 1.

The separating device D includes spaced strips 32, 32 (Figs. 1 and 2), which are separated from each other by a distance greater than the width of the sheet of rubber which is to be operated upon, and may consist of some such material as leather or rubber belting. The strips are held in the desired relation to each other by transverse bars 34, which may be of wood or formed sheet-metal, spaced from one another at suitable intervals longitudinally of the separator and riveted to the strips 32 at 36. Extending the full width of the separator is a web 38, which may be of thin canvas or rubber belting, secured between the strips 32 and the bars 34, the latter preventing it from sagging. This web furnishes a supporting surface, upon which the sheet-rubber stock may rest and be thus held against bending inwardly from the form it is desired it shall assume upon the reel and protected from contact with the edges of the bars. Both the strips and bars may be considered as projections from the surfaces of the web, the former being of a thickness greater than that of the stock. At their opposite ends, the strips have securing devices 40, in which are shown buttonhole slots arranged to engage headed studs 42 projecting from the cores 22 of the reels.

There is placed in the bearings at the outer end of the frame 12 a reel 18, upon which has been wound, as a result of another step of the method which will appear later, a coil of the separator D. The free end of this separator is led below the reel 20 under the guide-roll 28 and over the roll 30, and its securing devices 40 brought into engagement with the studs 42 of the reel 20, which is mounted on a frame adjacent to the calender. By a downwardly inclined surface E furnished by the web 38 of the separator, there is provided a receiving apron, which leads from the roll 30 in close proximity to the calender beneath the core of the reel 20. Now the production of the sheet S by the calender is started, and the end of this sheet is placed upon the surface E, whereupon, as the sheet is extruded from the rolls, the reel 20 is rotated by the crank 26, and the separator and web of rubber-stock are wound about the reel at the same rate without any stretching or distorting force being exerted upon the rubber. There is thus formed a coiled package of the stock contained in a spiral space, of which both the dimensions longitudinally of the axis of the reel and radially thereof are greater than of said stock. This is consequently held entirely free from pressure, other than that produced by its own weight, and portions of the web are absolutely guarded from contact with and adhesion to each other. While, as herein illustrated, the stock passes directly from the calender-rolls to the separator, in some aspects of my invention a certain amount of slack in the stock may intervene, to compensate for differences in the rate of travel of the stock at the calender-rolls and at the receiving reel. What is important is that between the rolls and the reel the soft stock shall have no opportunity to become deformed. The production of the package-coil proceeds continuously until the reel 20 is full, when the operation of the calender is stopped, and the package is ready for transfer to the point at which the stock is to be used. It should be noted that, at the calender and at the point of utilization or of storage, if the latter is desirable, the space occupied by the coil of stock is relatively small, and that its form is such that it may readily be transported.

Considering the use of the package formed as has just been described, the reel and its contents are placed with its spindles 16 in bearings 44 in a frame 46. Here the reel, which has previously received the coil of separator and rubber-stock, becomes a supply-reel, and is, in Fig. 5, designated by the numeral 48. In bearings in the frame below the supply-reel is placed an empty receiving reel 50, which is so situated that the peripheries of its heads 24 bear against grooved driving rolls 52, 52 fixed upon a shaft 54 journaled across the lower portion of the frame. Rotatable upon the frame, at the front of and in proximity to the reel 48, is a guide-roll 56, below which extends a support for the rubber-stock. This support is shown as in the form of a cutting table 58, which may be adjustable as to angle to suit the convenience of the workman. The shaft 54 and therefore the receiving reel 50 contacting with it are rotatable from some source of power, a pulley and belt for this purpose being indicated at 60. This rotation of the shaft and reel may be controlled by clutch mechanism 62, which is brought into engagement by a treadle 64 at the cutter's position. A spring 66 maintains the clutch normally disengaged.

The reel with its coil of sheet-rubber stock and separator being in place at 48, the securing devices 42 at the ends of the separator-strips 32 are attached to the reel 50, the extremity of the web of rubber, which is freed by this operation, being carried over the guide-roll 56 and laid upon the table 58. The cutter, with a knife, operates upon such portions of the stock as are convenient to reach, and then, depressing the treadle 64, causes the driving mechanism to rotate the roll 50. This, without tension upon the stock tending to distort it, draws off the separator from the reel 48, and in rotating such reel feeds the stock across the cutter's table. This continues until the treadle is released. Such alternate operations of cutting and feeding continue until the package upon the supply-reel has become exhausted, when the reel 50 has been filled with the coil of separator and is ready for transfer to the packaging apparatus, taking its place at 18 for delivery to the receiving reel 20. Throughout the entire length of the extended web of stock, the economy of cutting is limited only by the operator's judgment, save at the extremities, where waste areas may occur.

Having described my invention, what I claim as new and desire to secure by Letters Patent of the United States is:

1. The method of operating upon rubber, which consists in forming from a mass of rubber a web of sheet-stock, delivering the stock upon a separator during the formation of the web, and coiling the stock and separator together, before said stock has become deformed and while maintaining between the convolutions of said separator a space greater than the thickness of the interposed stock and during continued formation of the web.

2. The method of operating upon rubber, which consists in forming a package by coiling together a web of sheet-rubber stock and a separator, before said stock has become deformed and while maintaining between the convolutions of said separator a space greater than the thickness of the interposed stock, unwinding this package-coil, forming the separator into another coil, and simultaneously therewith delivering the stock for an operation upon it.

3. The method of operating upon rubber, which consists in forming from a mass of rubber a web of sheet-stock, depositing the end of the web of stock as it is formed upon a separator, and coiling the stock and separator together by a force applied to said separator to advance this at a rate leaving the stock free from tension while maintaining a space between the convolutions of said separator greater than the thickness of the interposed stock.

4. The method of operating upon rubber, which consists in forming from a mass of rubber a web of sheet-stock, depositing the end of the web of stock as it is formed upon a separator, forming a package by coiling the stock and separator together by a force applied to said separator while maintaining a space between the convolutions of said separator greater than the thickness of the interposed stock, unwinding the package-coil by a force applied to the separator, coiling the unwound separator independently of the stock, and delivering said stock as it is unwound for the operation upon it.

5. The combination with calender-rolls, of a reel arranged to supply a separator for sheet-rubber issuing from the calender-rolls, a receiving reel for a separator, and a guide situated in proximity to the bite of the calender-rolls and over which the sheet-rubber passes directly upon its emergence from said calender-rolls in preparation for its winding with the separator upon the receiving reel.

6. The combination with calender-rolls, of a reel arranged to supply a separator for sheet-rubber issuing from the calender-rolls, a receiving reel for the separator, and rolls arranged to guide the separator into proximity to the bite of the calender-rolls and furnish thereon a receiving surface upon which the sheet-rubber from said calender-rolls descends and is laid directly upon its emergence from said rolls in preparation for its transfer to the receiving reel.

7. The combination with calender-rolls, of a frame located at the delivery-side of said calender-rolls, a reel arranged to supply a separator for calendered rubber and being rotatable at the outer extremity of the frame, a guide roll arranged to direct the separator from the supply-reel in proximity to the bite of the calender-rolls to receive sheet-rubber therefrom, the separator thereafter passing outwardly from said calender-rolls and carrying the sheet-rubber above the guide-roll, a reel rotatable upon the frame between the supply-reel and the guide-roll to receive the separator and sheet-rubber, and means arranged to drive the receiving reel to coil together upon it the separator and rubber.

8. The combination with a reel arranged to supply a sheet of rubber with a separator, of a reel upon which the separator may be received, means arranged to rotate the receiving reel and uncoil the rubber from the supply-reel by a force applied wholly to the separator, and a support over which the end of the rubber passes as it is uncoiled.

9. The combination with a cutting table, of a reel situated above the table arranged to supply sheet-rubber with a separator therefor and being mounted adjacent to the table, a receiving reel to which the separator is connected, and means arranged to rotate the receiving reel to coil the separator thereon, leaving the rubber free to advance by gravity across the cutting table.

10. The combinations with a cutting table, of a reel arranged to supply sheet-rubber with a separator therefor and being mounted adjacent to the table, a receiving reel to which the separator is connected, power mechanism arranged to rotate the receiving reel to coil the separator thereon and advance the rubber across the cutting table, and means controllable at the cutting table for connecting the power mechanism to and disconnecting it from the receiving reel.

11. The combination with a frame, of a cutting table mounted at one end thereof, a supply-reel for sheet-rubber with a separator therefor rotatable at the top of the frame adjacent to the cutting table, a guide-roll for the sheet-rubber situated between the supply-reel and table, a receiving reel to which the separator is connected rotatable below the supply-reel, a power-shaft, connections to the shaft for coiling the separator upon the receiving reel and feeding the rubber over the guide-roll upon the table, driving mechanism for the shaft including a clutch, and means at the table for controlling the clutch.

In testimony whereof I have signed my name to this specification.

ERNEST W. STACEY.